US009567791B2

(12) United States Patent
Hartmann et al.

(10) Patent No.: US 9,567,791 B2
(45) Date of Patent: Feb. 14, 2017

(54) METHOD FOR ACTUATING A DRIVE MEANS OF A WINDOW POSITIONING DEVICE FOR POSITIONING A WINDOW PANE OF A VEHICLE, AND CONTROL DEVICE SUITABLE THEREFOR

(71) Applicant: AUDI AG, Ingolstadt (DE)

(72) Inventors: Juergen Hartmann, Gutenstetten (DE); Andreas Stueber, Hofstetten (DE); Patrick Sassmannshausen, Boehmfeld (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/443,826

(22) PCT Filed: Nov. 15, 2013

(86) PCT No.: PCT/EP2013/003450
§ 371 (c)(1),
(2) Date: May 19, 2015

(87) PCT Pub. No.: WO2014/079552
PCT Pub. Date: May 30, 2014

(65) Prior Publication Data

US 2015/0292253 A1 Oct. 15, 2015

(30) Foreign Application Priority Data

Nov. 21, 2012 (DE) ........................ 10 2012 022 739

(51) Int. Cl.
*B60R 22/00* (2006.01)
*E05F 15/00* (2015.01)
(Continued)

(52) U.S. Cl.
CPC ........ *E05F 15/695* (2015.01); *E05Y 2201/604* (2013.01); *E05Y 2400/32* (2013.01);
(Continued)

(58) Field of Classification Search
USPC ............................................................ 701/49
See application file for complete search history.

(56) References Cited

U.S. PATENT DOCUMENTS 5,734,245 A * 3/1998 Terashima ......... G05B 19/4061 318/453
5,801,501 A * 9/1998 Redelberger .............. F16H 1/16 318/283
(Continued)

FOREIGN PATENT DOCUMENTS

CN 101025631 8/2007
CN 101665076 3/2010
(Continued)

OTHER PUBLICATIONS

Chinese Office Action for related Chinese Patent Application No. 201380020829.1, issued Sep. 14, 2015, 6 pages.
(Continued)

*Primary Examiner* — Jean-Paul Cass
(74) *Attorney, Agent, or Firm* — Staas & Halsey LLP

(57) ABSTRACT

A drive device of a window positioning device positions a window of a vehicle to selectively cover a window opening. The drive device is operated by a control device. When the window is fully closed, the drive device is operated (a) in an opening direction and then (b) in a closing direction. The operation of the drive device is carried out depending on a drive parameter. In a), using a first value of the drive parameter, the drive device is brought into a first reduced load position, and in b), using a second value of the drive parameter, the drive device is brought into a second reduced load position in which the window positioning device is in a reduced load state. A control device and a window positioning device are used.

16 Claims, 4 Drawing Sheets

(51) Int. Cl.
*G05D 1/00* (2006.01)
*E05F 15/695* (2015.01)

(52) U.S. Cl.
CPC ..... *E05Y 2400/354* (2013.01); *E05Y 2800/40* (2013.01); *E05Y 2900/516* (2013.01); *E05Y 2900/55* (2013.01)

(56) References Cited

U.S. PATENT DOCUMENTS

| | | | | |
|---|---|---|---|---|
| 6,246,195 | B1 | 6/2001 | Kloesters | |
| 6,472,836 | B1 * | 10/2002 | Uebelein | H02H 7/0851 318/434 |
| 7,402,971 | B2 * | 7/2008 | Averitt | E05F 15/40 318/266 |
| 7,530,199 | B2 * | 5/2009 | Yokomori | E05F 15/646 49/506 |
| 7,863,846 | B2 * | 1/2011 | Biskup | B62D 35/007 318/466 |
| 8,291,645 | B2 | 10/2012 | Höhn et al. | |
| 8,818,646 | B2 * | 8/2014 | Heinrich | H02H 6/005 318/434 |
| 9,058,035 | B2 * | 6/2015 | Schlesiger | G05B 24/02 |
| 2004/0257010 | A1 | 12/2004 | Yamamoto | |
| 2007/0201843 | A1 | 8/2007 | Takahashi | |
| 2010/0106379 | A1 | 4/2010 | Soltana et al. | |
| 2010/0168968 | A1 | 7/2010 | Kalb | |
| 2010/0211273 | A1 * | 8/2010 | Kollner | E05F 15/70 701/49 |
| 2013/0283692 | A1 | 10/2013 | Zawade et al. | |
| 2014/0073971 | A1 * | 3/2014 | Carlson | A61B 7/04 600/485 |
| 2015/0292253 | A1 * | 10/2015 | Hartmann | E05F 15/695 701/49 |

FOREIGN PATENT DOCUMENTS

| | | |
|---|---|---|
| CN | 102052035 | 5/2011 |
| CN | 201963107 | 9/2011 |
| DE | 10338767 | 3/2005 |
| DE | 102006049223 | 4/2008 |
| DE | 202006019114 | 6/2008 |
| DE | 102008014520 | 11/2008 |
| DE | 102010036205 | 3/2011 |
| DE | 102010056226 | 6/2012 |
| DE | 10 2012 022 73.6 | 11/2012 |
| WO | 2011/023955 | 3/2011 |
| WO | PCT/EP2013/003450 | 11/2013 |

OTHER PUBLICATIONS

English language International Search Report for PCT/EP2013/003450, mailed Jan. 21, 2014, 4 pages.
German Decision to Grant for German Priority Patent Application No. 10 2012 022 739.6, issued Jun. 27, 2013, 4 pages.
WIPO English Language Translation of the International Preliminary Report on Patentability for PCT/EP2013/003450, mailed on Jun. 4, 2015, 7 pages.
Office Action mailed Feb. 24, 2016 in Chinese Patent Application No. 201380020829.1, 5 pages.
European Office Action issued on Nov. 15, 2016 in corresponding European Patent Application No. 13 798 569.3.

* cited by examiner

METHOD FOR ACTUATING A DRIVE MEANS OF A WINDOW POSITIONING DEVICE FOR POSITIONING A WINDOW PANE OF A VEHICLE, AND CONTROL DEVICE SUITABLE THEREFOR

CROSS REFERENCE TO RELATED APPLICATIONS

This application is based on and hereby claims priority to International Application No. PCT/EP2013/003450 filed on Nov. 15, 2013 and German Application No. 10 2012 022 739.6 filed on Nov. 21, 2012, the contents of which are hereby incorporated by reference.

BACKGROUND

The invention relates to a method for operating a drive device of a window positioning device for positioning a window pane of a vehicle. Moreover, the invention relates to a control device for operating the drive device.

Methods for displacing a window pane are known, with which the window pane is displaced from an end position into an intermediate position in order to facilitate the opening or closing of a vehicle door, especially for frameless windows. Methods are also known with which window panes are pressed down into a mechanical stop for better sealing, especially depending on a high vehicle speed. When displacing the window pane into the end position and when pressing down, high preload forces often occur within a window mechanism.

The German patent application DE 10 2010 056 226 A1 discloses a method for lowering a window pane of a vehicle prior to an occupant of the vehicle disembarking, with which the lowering can be initiated by operating a belt buckle, especially with a frameless vehicle door.

The German patent application DE 10 2010 036 205 A1 discloses a method for pressing down a window pane of a vehicle into an end position on a mechanical stop depending on a driving state of the vehicle in order to ensure good sealing of the interior of the vehicle, especially if there is mechanical play. Pressing down can take place with a defined force and with a slowly increasing force up to a final value of the force, in order to gently approach the stop and to keep audible noise low. The force can be adjusted by pulse width modulated current. The pressing down can especially take place depending on a vehicle speed, a temperature or a time period.

The German patent application DE 10 2006 049 223 A1 discloses a method for the positioning of a window pane of a vehicle in a short stroke position separate from a seal in order to keep the window pane free of the seal and to facilitate opening of a door of the vehicle, wherein mechanical play can be compensated.

The German patent application DE 103 38 767 A1 discloses a method for the positioning of a window pane of a vehicle in a short stroke position when opening a vehicle door and a door window control system, wherein a proximity sensor is provided, especially in the area near a door handle, in order to displace the window pane into the short stroke position shortly before opening the vehicle door, especially shortly before operating the door handle.

The German patent application DE 10 2008 014 520 A1 discloses a method for the lowering of a window pane of a vehicle into a short stroke position when opening a vehicle door, with which lowering can be initiated by a heat sensor preferably disposed in the area near a door handle that detects a hand of a user of the vehicle in a detection region.

SUMMARY

One possible object is to provide a method and a device for the operation of a window pane of a vehicle such that structural stress on the device is low.

The inventors propose a method for the operation of a drive device of a window positioning device for the positioning of a window pane of a vehicle, wherein the window pane is designed to cover a window opening and can be displaced by the window positioning device in a closing direction and in an opening direction, and wherein the drive device is operated by a control device, with the following sequence

- a) operating the drive device in the opening direction starting from an initial position of the drive device, in which the window pane is in a closed end position and the window positioning device is in a first preload state for preloading the window pane; and
- b) operating the drive device in the closing direction, wherein the operation of the drive device takes place depending on a drive parameter.

It is provided that the operation in a) is carried out by a first value of the drive parameter and the drive device is thereby brought into a first reduced load position and the operation in b) takes place by a second value of the drive parameter and the drive device is thereby brought into a second reduced load position in which the window positioning device is in a second preload state, wherein the second value is smaller than the first value and the window opening is covered in the second reduced load position, and wherein in the second preload state the window positioning device is subjected to a smaller preload than in the first preload state.

The proposals are based on the fact that the service life of a window positioning device can be increased if a drive device is operated in the closing direction more smoothly or more gently or less powerfully or less far or much less or even more slowly than when normally displacing it in the closing direction into the end position. By using a second value that is smaller than the first value, the load on a window positioning device can be reduced, especially on a drive device of the window positioning device and/or a gearbox device, especially mechanical components, of the window positioning device. Reducing the load on the drive device or the gearbox device is advantageous because a window pane is moved into an end position with a large force in most cases for good sealing or sound insulation or for user-friendly operation at high speed and thus accompanying accelerations and bearing forces, resulting in a large preload in the drive components or bearings of the window positioning device. The load reduction e.g. results in the gearbox device or any other mechanism or other mechanical components of the window positioning device being less highly stressed. This can ensure a longer service life of the window positioning device. At the same time, less costly mechanical components can be used, e.g. gearwheels made of plastic material. In other words, the method for the operation of the drive device corresponds to a method for reducing the load on a window positioning device, whether this is the drive device itself or a gearbox that interacts with the drive device, or any bearing of the window positioning device. Operation of the drive device does not necessarily include displacement of the window pane. Preferably, the window pane remains closed when operating the drive device in the opening direction, regardless of whether it is displaced or not. The window pane can e.g. be displaced to a minimal extent along a seal and can thereby cover the window opening. More preferably, the first value is selected such that the window pane is not displaced.

The method can be carried out manually or automatically. Manual operation of the drive device can e.g. be initiated by a special type of depression of a pushbutton to operate the drive device, e.g. a rocking movement on the pushbutton, especially corresponding initially to a pressure on a side of the pushbutton that is operated to displace a window pane downwards in the opening direction, in combination with pressing on a side of the pushbutton that is operated to displace the window pane upwards in the closing direction.

The method is preferably a method for the automatic operation of the drive device, which can be carried out automatically, especially depending on predefined conditions and/or current measurement values. The operation of the drive device in the closing direction takes place automatically in response to the operation of the drive device in the opening direction. Preferably, a condition is predefined, such as e.g. switching off the ignition of the vehicle or locking of the vehicle with the ignition switched off. Optionally or additionally, e.g. a time variable can be provided, e.g. between five and 120 minutes, preferably ten to 30 minutes. E.g. an occupant presence value can be used as a measurement value, whereby e.g. carrying out the method can be prevented if there are still occupants in the vehicle. The humidity or the temperature in the vehicle surroundings can also be measured. If the temperature or the humidity deviates too much from a threshold value, the method can be inhibited, e.g. in order to maximize the sealing between a window pane and a vehicle door seal. The method is then only carried out e.g. if the vehicle is parked in a dry garage.

The drive device can thereby be set by a) into a first reduced load position or into a first reduced load state and by b) into second reduced load position or a second reduced load state, wherein in the second reduced load state the drive device exerts a preload force on a gearbox device of the window positioning device in the closing direction that is smaller than a preload force acting on the gearbox device in the closing direction in an initial position of the drive device prior to a). In the first reduced load state the drive device preferably does not exert a noticeable preload force acting in the closing direction or only exerts a small preload on a gearbox device of the window positioning device compared to a preload in an initial position. The preload force exerted by the drive device in the second reduced load state is e.g. 5 to 90 per cent, preferably 10 to 60 per cent, more preferably 20 to 40 per cent, in each case in relation to 100 per cent preload force in the initial position, and in the first reduced load state it is e.g. 1 to 50 per cent, preferably 5 to 30 per cent, more preferably 10 to 20 per cent. Preferably, with the method for setting the respective reduced load state, a force sensor is used that provides measurement data about the preload force to a control device. The force sensor can be disposed at an interface or coupling point between the drive device and the gearbox device.

With the method a comparison is carried out between the first preload state and the second preload state. The window pane is placed in the second preload state, especially over a longer period. In the second preload state a preload in the window positioning device exerted on the window pane by the window positioning device is smaller than in the first preload state. The preload can e.g. be of a bearing force, a contact pressure between gearbox components, a traction force in a cable, a torque on a gearwheel or a thrust on any other mechanical component of the window positioning device. The preload can also be indirectly determined by a pressure exerted by the window pane on a seal or a door frame. The preload can e.g. be determined by strain gauges or piezo sensors or a different suitable force and/or pressure sensor.

By controlling the process by a drive parameter, the load relief can take place regardless of an actual position or displacement of a window pane and regardless of the type of the drive. The magnitude of a positioning movement can be specified by the drive parameter of the drive device. The first and second values of the drive parameter can each be defined by a control device or a vehicle system for a certain vehicle or a certain window positioning device, i.e. they are predetermined by a control device. The two values can be in a defined ratio to each other, so that a certain operation in the opening direction normally results in defined operation in the closing direction. This is e.g. advantageous with regard to a simple design of the window positioning device, because e.g. position sensors or force sensors can be saved. Especially with regard to a load reduction for which a window pane is not to be displaced, a predefined ratio of the values is advantageous. The first value can be defined such that a preload occurring in the window positioning device can be completely diminished and the second value can be defined such that again a light force in the closing direction can be exerted on a window pane by the drive device and the window pane is not loosely placed but immovably fixed at least approximately in the end position. In other words, the second value can e.g. be defined solely with regard to a mechanical play that is inherent within the system. However, the second value can also be readjusted, especially increased, with regard to a preload force on a seal that decreases with time. The readjustment can take place on the basis of experience or based on measurement values provided by a force sensor or preload sensor. The second value can also be changed in order to ensure that the window pane is not always clamped by the same mechanical sub components. This is e.g. advantageous for a system of teeth. The second value can especially be changed such that the preload force is not always transferred by the same teeth of meshing sets of teeth, but e.g. by the respective previous or subsequent tooth after a certain time or a certain number of operations of the drive device. This enables the wear to be reduced and the service life to be further increased. Operating noise can also be kept low, because it is not made loud by increased mechanical play.

It can be ensured with a predefined ratio that the requirements for good sealing and for theft protection are also ensured regardless of the purpose of a load reduction of the window positioning device. The ratio of the first value to the second value is preferably in the range from 1.25 to 10, more preferably in the range from 1.25 to 5, particularly preferably in the range from 1.5 to 2. The ratio can turn out to be completely different depending on the type of the drive device or the type of the mechanical components. With a cable mechanism e.g. a smaller ratio can be sufficient for load reduction than for a system of teeth with relatively high coefficients of friction.

In order to set the values of the drive parameter for a specific vehicle, a force sensor can be provided on individual components of the mechanism of the window positioning device, by which a preload in the window positioning device can be determined. This enables the adjustment of wear in the window positioning device over a long operating period, e.g. by adjusting the ratio between the first and second values with increasing service life. This is because it is to be expected that the coupling of individual mechanical components, especially gearbox parts made of a plastic material, becomes less accurate with increasing service life and a preload can be diminished at a smaller second value of the drive parameter, e.g. for a system of teeth.

The drive parameters or the values of the drive parameters can be provided to the drive device, e.g. in the form of a control signal, and the control signal can e.g. be produced by a vehicle system or by a control device that is separate or that is provided in the window positioning device. The values of the drive parameters or a plurality of different values for specific situations can optionally also be stored in the drive device and called up independently of a control device.

Operation in the opening direction can take place with such values of the drive parameter that the window pane can be displaced from an end position in which it is closed (especially maximally) into a first intermediate position, and operation in the closing direction can take place with such values of the drive parameter that the window pane can be displaced back from the first intermediate position towards the end position. Said values can be different according to the situation depending on the age of a seal or the temperature and thus also on the friction on a seal. The values of the drive parameter can thus also be selected such that the window pane is also actually moved. The window pane is then displaced from the first intermediate position back towards the end position into a second intermediate position between the first intermediate position and the end position. Preferably, the values of the drive parameter both in the opening direction and also in the closing direction are selected such that the window pane hardly moves or does not move noticeably. In other words, in the intermediate positions the window opening is not necessarily uncovered, rather the window pane can be displaced by hardly detectable or measurable values and thereby in any case further contacts a seal so that the window opening also remains closed in the intermediate positions. According to a preferred version of the method, the drive is only operated by such small values that the window pane is not displaced at all. This enables a drive device to be relieved of load without the window pane having to be moved. This is energetically advantageous, can take place in a particularly rapid way and is not noticeable by a vehicle occupant or a person leaving the vehicle. In particular, in combination with a drive device having a system of teeth and/or a cable, this enables a preload to be taken up by the window positioning device and the mechanism of the window positioning device to be relieved of load, which increases the service life. The values of the drive parameter are selected to be small such that the window pane itself is not moved, but the components of the mechanism of the window positioning device to be relieved of load may also have a purpose regarding a still longer service life of the window positioning device.

In principle, reducing the load on components of the window positioning device can already take place by only operating the drive device in the opening direction when the vehicle is at rest, thus e.g. a cable is simply relieved of load or de-tensioned. However, it has been shown that with regard to theft protection or good sealing of the vehicle it is advisable to operate the drive device back in the closing direction in any case, especially with reduced force and/or speed, which can preferably take place by pulse width modulation. This enables it to be ensured that even with the load on the components reduced a window pane does not sit too loosely in the window opening, and thus cannot be displaced downwards in the opening direction from the outside, and that adequate sealing of the interior of the vehicle is also ensured with the vehicle stationary for long periods.

According to an advantageous exemplary embodiment, the drive device is a rotary drive device, wherein the drive parameter is an angle unit. By an angle unit that is larger in the opening direction than in the closing direction, reducing the load on the window positioning device can take place by the rotary drive device without a displacement of the window pane having to necessarily take place. A preload present in the window positioning device can be reduced by a small rotary movement in the opening direction. The rotary drive device is e.g. implemented as an electric motor. In this case the window positioning device comprises e.g. a cable.

According to one advantageous exemplary embodiment, the window positioning device comprises a system of teeth, wherein the drive parameter is an angle unit or a length unit. By a length unit that is larger in the opening direction than in the closing direction, reducing the load on the window positioning device can take place without a displacement of the window pane necessarily having to take place. The drive device is e.g. in the form of a linear motor in this case.

According to one advantageous exemplary embodiment, b) takes place with reduced force and/or reduced speed compared to a), especially using pulse width modulation of a control signal delivered by a control device to the drive device and comprising information about the drive parameter. The decisive force can correspond to the force with which a window pane is pressed into a seal in the closing direction, or even the force with which a window pane contacts a seal of the window opening orthogonally to the closing direction, or even the force that has to be used in order to be able to displace the window pane at all.

A reduced speed gives the advantage that the window pane can be accurately and gently positioned, and that acceleration impulses or braking impulses in the drive device are weaker. At reduced speed an approach to an end position can take place more precisely, and at the same time a regulated preload received from the window positioning device can be reduced again, e.g. to 25 to 40 per cent.

According to one advantageous exemplary embodiment, the operation of the drive device in the opening direction takes place in response to locking of the vehicle or shutting off an engine of the vehicle, especially performed by a vehicle user. This enables storage of the window pane under less stress if the vehicle remains unused, especially over a long period of time of several days or even weeks. This ensures a long service life of the mechanical components of a window positioning device, especially of gearwheels or of gearbox components.

The locking of the vehicle or the shutting off of the engine can be carried out by a vehicle system, which e.g. is connected to a speed sensor or sensors that detect whether there is an occupant seated in the vehicle. The vehicle system can then request a control device to automatically provide a corresponding signal to the window positioning device in order to reduce the load on the window positioning device. The vehicle system can also be directly connected to the drive device. Preferably, the locking of the vehicle is to be provided as a triggering event (trigger) for the method. Optionally however, a time variable can also be taken into account so that the drive device is not operated too frequently, e.g. in urban traffic, but only e.g. if the vehicle is turned off in the afternoons or evenings, overnight or over several days.

According to one advantageous exemplary embodiment, a displacement of the window pane from an at least partly open position into an end position takes place before a). The displacement of the window pane into the end position is advisable in order to always reduce the load on a window positioning device starting from a defined position. In the end position the window pane has been moved with normal force and/or speed to a stop defining the end position. This ensures that the window pane also fixedly contacts a seal and that sealing of the vehicle takes place in a defined manner. The method for reducing the load on the window positioning device can then be carried out starting from the end position on the basis of the drive parameter as described before. An actual displacement of the window pane is not absolutely necessary here.

If the method for reducing the load on the window positioning device were not carried out in relation to the end position, there would be the risk that the window pane does not contact a seal tightly enough, and thus that leaks can occur or theft protection cannot be guaranteed.

The positioning of the window pane in the end position preferably takes place here in conjunction with closing the window, e.g. with the automatic closing of the window or even all windows and sliding roofs, if a vehicle is switched off and locked. In other words, the window pane does not have to be stowed in the end position in order to be able to carry out the method for reducing the load on the drive device. In this case the at least partly open position can also correspond to one of the intermediate positions, but rather coincides with a position in which the window pane also uncovers the window opening, e.g. by a third, a half or fully.

According to one advantageous exemplary embodiment, the window pane is displaced in a) from an end position in which it is closed (especially maximally) into a first intermediate position, wherein a position is specified as a first intermediate position that is at a distance from the end position that is 1 to 10 millimeters, preferably 0.5 to 3 millimeters, more preferably 0.25 to 1 millimeter. Preferably, a position is specified as a second intermediate position between the first intermediate position and the end position that is at a distance from the end position that is 0.1 to 5 millimeters, preferably 0.1 to 2.5 millimeters, more preferably 0.1 to 0.5 millimeter.

It should be mentioned that the intermediate positions can also relate to angle positions, and can then be given in degrees, e.g. if the window pane is a window pane that can be displaced by folding or pivoting. The angles of the first and second intermediate positions can be e.g. in the range from 0 to 5 degrees, preferably 0.1 to 2 degrees, more preferably 0.1 to 1 degree in relation to the (maximum) closed end position.

According to one advantageous exemplary embodiment, the operation in b) is carried out by a control device, which delivers a control signal to the drive device that is pulse width modulated at least for the operation in b). Communications between the control device and the drive device take place in this case in the form of PWM control based on the control signal. Preferably, the PWM control for b) is carried out by a pulse width modulation (PWM) at 20 to 80 per cent, preferably 30 to 60 per cent, more preferably 35 to 50 per cent, particularly preferably 40 per cent, especially of a time component or a force component.

Optionally, an operation in a) can also be carried out by a pulse width modulated control signal. This has the advantage that a window pane remains in the (maximum) closed end position with greater reliability if the drive unit is being operated in the opening direction. This enables a load reduction to be simply achieved, even with drive devices that can be adjusted less accurately. This is because the window pane was initially driven in the closing direction into the end position with full force, and e.g. half the force is now being applied in order to operate the drive device in the opening direction and to reduce the load on the window positioning device, and thus it is highly probable that the window pane is not displaced in this case and e.g. the seal between the window pane and a door seal is not affected. Nonetheless, the preload of the window positioning device can be dispensed with because the operation of the drive device in the opposite direction causes a displacement of the mechanical components relative to each other and/or the reduction of a torque applied between the gearbox components or a tension in any traction components such as e.g. cables. PWM control for a) is preferably carried out by a pulse width modulation (PWM) at 30 to 90 per cent, preferably 40 to 80 per cent, more preferably 45 to 65 per cent, particularly preferably 55 per cent, especially of a time component or a force component.

The object is also achieved by a control device, which is suitable for controlling a method for the operation of a drive device for a window positioning device for the positioning of a window pane of a vehicle or is suitable for the operation of the drive device, wherein the window pane is designed to cover a window opening and can be displaced by the window positioning device in a closing direction and in an opening direction starting from an initial position of the drive device in which the window pane is in a closed end position, wherein the window positioning device is in a first preload state in the closed end position, wherein the control device is coupled to the drive device and is designed to deliver a control signal to the drive device and to operate the drive device depending on a drive parameter, wherein it is provided that the control device is designed to produce a control signal depending on a first value of the drive parameter for the operation of the drive device in the opening direction to bring the drive device into a first reduced load position and depending on a second value of the drive parameter for the operation of the drive device in the closing direction to bring the drive device into a second reduced load position such that the window positioning device is in a second preload state in the second reduced load position, wherein the second value is smaller than the first value and the window opening is covered in the second reduced load position, and wherein in the second preload state the window positioning device is subjected to a smaller preload than in the first preload state.

The values can be selected or the control signal can be provided such that the window pane can be displaced back from a first intermediate position towards an (especially maximal) closed end position up to a second intermediate position with a reduced force and/or reduced speed compared to a displacement from the end position into the first intermediate position. In other words, the window pane can be displaced back from a first intermediate position towards a closed end position up to a second intermediate position with reduced force and/or reduced speed compared to a displacement from the end position into the first intermediate position.

The control signal is preferably produced such that the window pane is not displaced by the drive device, but a preload force acting between the drive device and a gearbox device in the closing direction is just reduced. In other words, the control signal can be produced such that the window pane remains in the end position.

Preferably, the control device comprises a pulse width modulation module for producing a pulse width modulated control signal. The pulse width modulation module (PWM module) can comprise at least one device selected from a group of devices consisting of a comparator circuit and a counter as well as an analogue comparator and a multivibrator, wherein the pulse width modulation module is designed to produce a pulse width modulated control signal for the drive device of the window positioning device. In this case there is preferably a comparator circuit or a counter for digital data or signals to be processed, and for analogue data or signals to be processed there is preferably an analogue comparator or a multivibrator.

A comparator circuit or a counter is designed to divide up the duration of an individual pulse by a timer function or by an external time standard, e.g. in 256 steps for 8-bit resolution, of which a defined percentage is activated depending on the desired output level, corresponding to 0 to 255 steps in the example.

A comparator is designed to produce a PWM signal by a comparison of the analogue signal with a suitable carrier signal, wherein as a PWM signal e.g. a rising or falling saw tooth signal or a triangular signal is advantageous for symmetrical modulation. For a rising or falling saw tooth signal, the position of one of the edges of the signal can be modulated in each case. For a triangular signal, the position of both edges of the signal can be modulated.

A multivibrator is designed to vary the duty cycle by a variable resistance or capacitor.

The determination of the pulse duration can be carried out using the approach that the arithmetic mean of the signal to be modulated in a pulse period corresponds exactly to the arithmetic mean of the PWM pulse sequence.

The control device is designed for the operation of the drive device according to the method or control of the method and is preferably connected to a position sensor and/or a force sensor for this.

A window positioning device for the positioning of a window pane of a vehicle can be coupled to the control device, wherein the window pane is designed to cover a window opening, with

- a drive device for the displacement of the window pane in a closing direction and in an opening direction;
- a gearbox device is coupled to the drive device;

wherein the window positioning device is designed to displace the window pane from an end position, in which it is (especially maximally) closed and the window positioning device is in a first preload state for preloading the window pane, in the opening direction into a first intermediate position, and to displace it back in the closing direction from the first intermediate position back towards the end position, wherein the drive device can be operated depending on a drive parameter;

wherein it is provided that the window positioning device is designed to operate the drive device in the opening direction and in the closing direction depending on a first value of the drive parameter for operation in the opening direction has a first value and depending on a second value of the drive parameter for operation in the closing direction, wherein the second value is smaller than the first value, wherein the window positioning device is designed to bring the drive device into a first reduced load position by the first value and by the second value into a second reduced load position in which the window positioning device is in a second preload state, wherein the window opening is covered in the second reduced load position, and wherein in the second preload state the window positioning device is subjected to a smaller preload than in the first preload state. Optionally, the control device can be part of the window positioning device.

The values of the drive parameter can be selected such that the window pane is also actually moved. The window pane can then be displaced from the first intermediate position back towards the end position into a second intermediate position between the first intermediate position and the end position. Optionally, the values of the drive parameter both in the opening direction and in the closing direction can be selected such that there is little or no window pane movement.

Preferably, the window positioning device is designed to operate the drive device in the opening direction such that the window pane remains disposed in the end position.

Preferably, the drive parameter is specified by a control device coupled to the window positioning device and the control device is designed to deliver a pulse width modulated control signal to the drive device. In this case the drive device can be operated in the opening direction depending on the control signal by the first value of the drive parameter such that the window pane can be displaced from an end position in which it is closed into a first intermediate position, and can be operated in the closing direction depending on the control signal by the second value of the drive parameter such that the window pane can be displaced again from the first intermediate position back towards the end position.

Preferably, the window positioning device is designed to displace the window pane back from a first intermediate position towards an especially maximally closed end position up to a second intermediate position with reduced force and/or reduced speed compared to a displacement from the end position into the first intermediate position, wherein the drive device is connected to the position sensor and/or to the force sensor and is designed to carry out the return displacement depending on a pulse width modulated control signal provided by the control device. The drive device preferably comprises a continuously variable drive for this. In particular, the drive, preferably a rotary drive, can be adjusted in units whose values are smaller than the first value of the drive parameter in the opening direction, especially at least by a factor of 3, preferably by a factor of 5, more preferably by a factor of 10. I.e., if a displacement of the window pane by e.g. 1 millimeter from the end position into the first intermediate position is desired, then the drive can be accurately adjusted to a 0.1 millimeter displacement distance, and if a displacement of the window pane by e.g. a maximum of 0.1 millimeter from the end position into the first intermediate position is desired, then the drive can be accurately adjusted at least to 0.01 millimeter displacement distance.

The window positioning device preferably comprises a position sensor and/or a force sensor, each of which is coupled to the drive device and/or a control device.

The gearbox preferably comprises first and second engagement devices, wherein the first and/or second engagement devices are each in the form of a gearwheel. Preferably, each gearwheel is made at least partly of plastic.

Optionally, the control device can be provided as a component of the window positioning device.

By a control device and a window positioning device, a system for the automatic control of a method for the automatic closing of a window of a vehicle can be provided. The system can be provided in a vehicle such as e.g. an automobile or a truck, whether it is in a driver's door on a window pane of the driver's door, or on any other door, or even on a window pane that is not provided in a door but directly in the body, e.g. a rear window in a coupe or cabriolet.

The embodiments presented in relation to the method and their advantages apply equally to the control device and the window positioning device.

The features and combinations of features mentioned above in the description and the features and combinations of features mentioned below in the description of the figures or shown in the figures alone can be used not only in the respective stated combination, but also in other combinations or on their own without departing from the scope.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
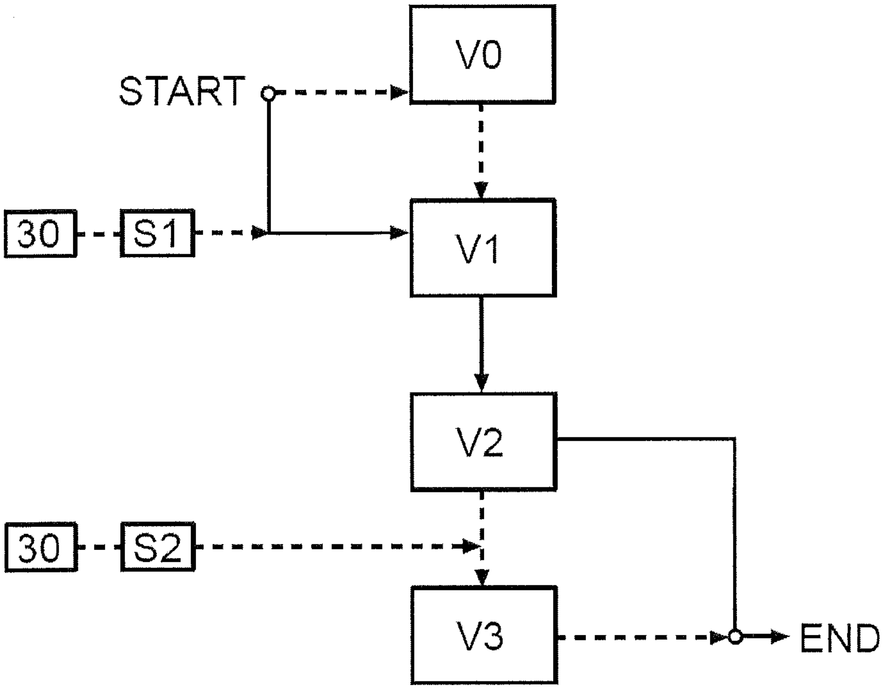
FIG. 1 shows schematically a method according to an exemplary embodiment of the proposal, by which a long service life and gentle stowage of a window positioning device can be ensured.

Reference will now be made in detail to the preferred embodiments of the present invention, examples of which are illustrated in the accompanying drawings, wherein like reference numerals refer to like elements throughout.

In FIG. 1 a process flow is shown that optionally starts with a displacement of a window of a vehicle into an end position according to process V0, or with a displacement from the end position into a first intermediate position according to process V1. The start of the process for the displacement of the window or the window pane can take place by a signal S1, which e.g. can be produced by a vehicle system 30. Signal S1 is e.g. associated with a shutdown and/or locking of a vehicle. Process V2, corresponding to a return displacement from the first intermediate position into a second intermediate position, follows process V1. The proposed method can already be carried out to a conclusion here, wherein the second intermediate position is provided between the first intermediate position and the end position. Optionally, the method can also comprise another process V3, corresponding to a return displacement from the second intermediate position into the end position. Said process V3 can e.g. be initiated by a signal S2, especially a signal for starting and/or for unlocking the vehicle, and said signal S2 can e.g. also be provided by the vehicle system 30. By the displacement of the window pane in an opening direction (corresponding to V1) and the following return displacement of the window pane in a closing direction (corresponding to V2) with reduced force and/or speed compared to the displacement in the opening direction, which e.g. takes place by pulse width modulation of a drive signal or control signal, a window positioning device, in particular a mechanism of the window positioning device, can be de-tensioned or loosened. This is primarily of interest for longer stationary periods of the vehicle.

It should be mentioned that instead of an actual displacement of the window pane, the operation of a drive device of a window positioning device can also take place only to such a small extent that the window pane is not moved at all. In the end position, the window pane is normally pressed with high force into a maximally closed position on a seal of a vehicle door, which is of interest e.g. with regard to high sound protection, especially for luxury vehicles that can be driven at high speed. Said force must be maintained by a window positioning device, wherein it has been shown that this is not necessarily required when the vehicle is stationary. By operating a drive device of the window positioning device in an opening direction, the load on the window positioning device can be reduced. The operation only has to be carried out to such an extent that a preload is reduced in the window positioning device. A subsequent operation of the drive device in a closing direction can then take place with regard to a smaller contact pressure of the window pane, i.e. by holding the window pane in the end position e.g. with reduced (preload) force.

This method is especially appropriate with regard to long stationary periods of a vehicle, but can also produce a longer service life of the window positioning device if it is used for vehicles that are only driven at low speeds in town over long phases. The signal S1 can then e.g. also be related to a certain speed and can be produced if the vehicle is driven below a certain speed. The signal S2 can then be produced by analogy if the vehicle again exceeds a defined speed. In order to prevent the window positioning device from being operated repeatedly in a short time, a time variable can also be taken into account when coupling the signals to the speed, using which it can be specified that the window positioning device is only operated if the speed is below a speed threshold value for at least a defined time threshold value.

Figure 2A:
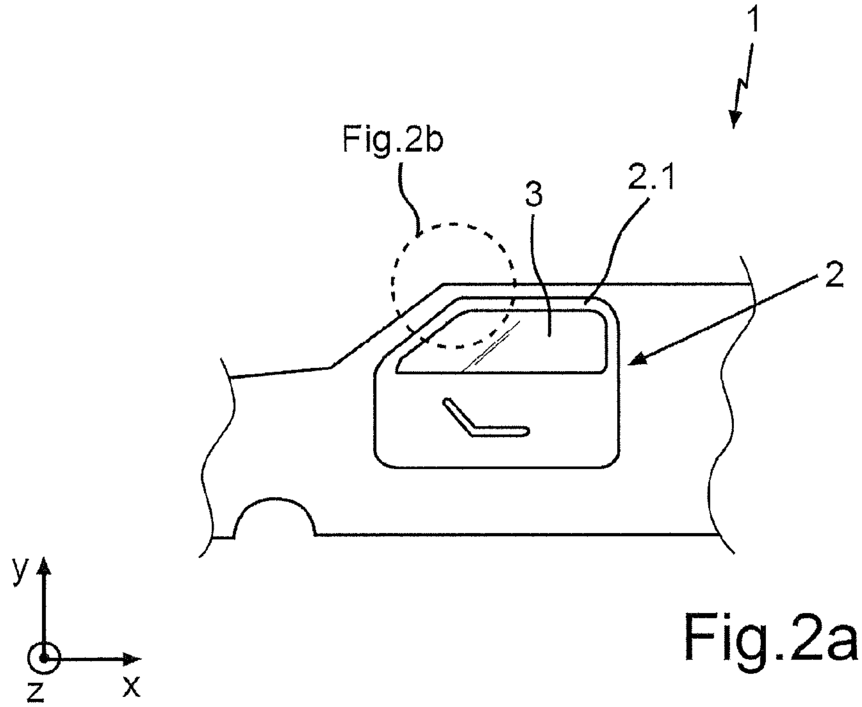
FIG. 2*a* shows a window pane disposed in a vehicle door in a schematic side view, for which the proposed method for the operation of a drive device for the positioning of the window pane can be used.

In FIG. 2*a* a vehicle 1 is shown on which a vehicle door 2 is provided that comprises a seal 2.1 on a door frame, especially in the vicinity of an end position of a window pane, and a window pane 3 is provided on the vehicle door 2. The window pane 3 can be displaced in the y-direction or opposite to the y-direction.

Figure 2B:
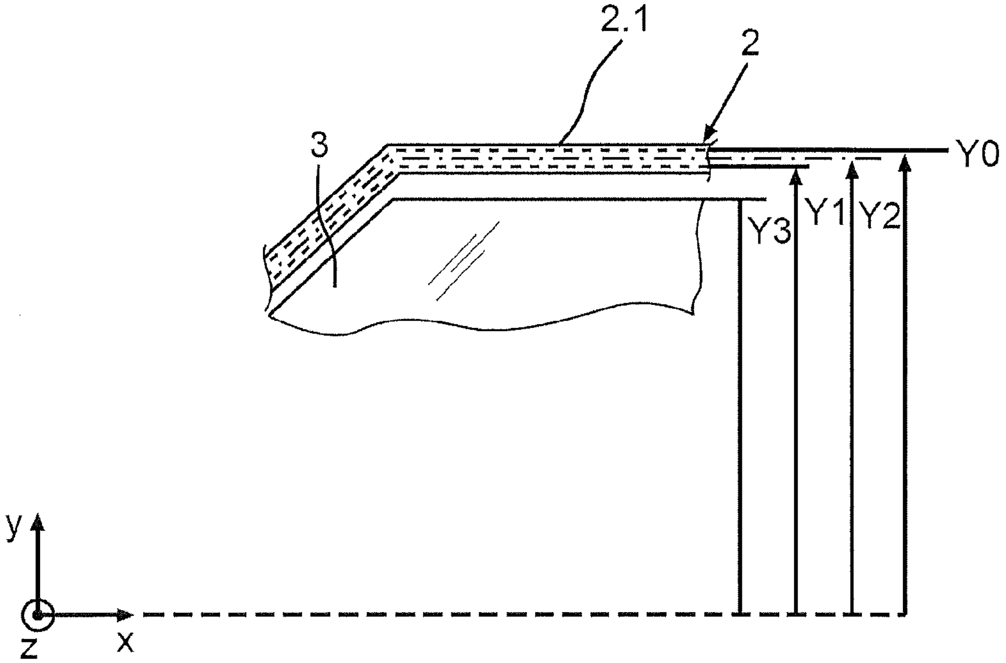
FIG. 2*b* shows a detailed view according to the detailed sectional view characterized in FIG. 2*a*, wherein different positions of the window pane are marked, into which the window pane can be displaced by the proposed method.

In FIG. 2*b* it is shown in detail in which positions the window pane 3 can be optionally positioned by operating a drive device according to the method. The operation of the drive device for positioning the window pane in intermediate positions Y1, Y2, which differ from a maximally closed end position Y0, is only one version of the method, because the displacement of the window pane 3 from the end position Y0 is not necessarily required in order to benefit from the advantages of the method. The window opening is closed in the example shown in the intermediate positions Y1, Y2, i.e. it is covered by the window pane.

FIG. 2*b* shows the end position Y0, a first intermediate position Y1, and a second intermediate position Y2, wherein the Y coordinate of the first intermediate position Y1 is smaller than the Y coordinate of the second intermediate position Y2 and of the end position Y0. It can be seen that the intermediate positions Y1, Y2 are provided in the area near a frame of a vehicle door 2, so that the window pane 3 can also come into contact with a seal 2.1 of the vehicle door 2 if the window pane 3 is placed in one of the intermediate positions Y1, Y2. An at least partly open position Y3, in which the window pane 3 is now actually disposed such that the window opening is at least partly open, is different from the intermediate positions Y1, Y2.

The window pane 3 can be displaced in an opening direction and a closing direction. In the design shown in FIG. 2*b*, an opening direction corresponds to a negative y direction and a closing direction corresponds to a positive y direction, as shown in the illustrated coordinate system.

Figure 3:
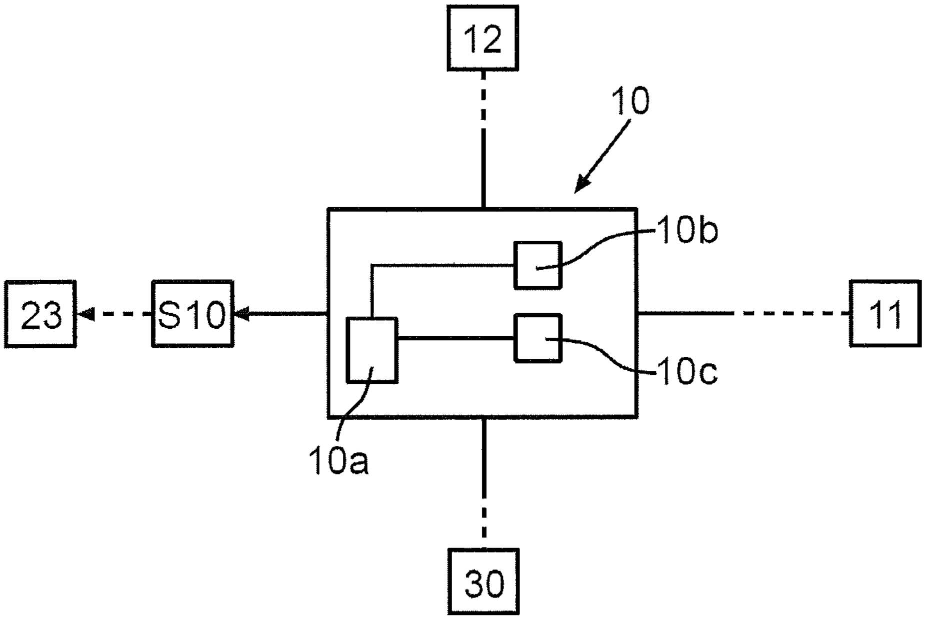
FIG. 3 shows in a schematic representation a control device according to an exemplary embodiment of the present proposal that is designed to provide instructions for a drive device for the displacement of a window pane such that the window pane can be displaced according to the method.

A control device 10 is shown in FIG. 3 that comprises a pulse width modulation module (PWM module) 10*a* that is connected to a counter/a comparator circuit 10*b* and an analogue comparator/a multivibrator 10*c*. Optionally, the counter/comparator circuit 10*b* or analogue comparator/multivibrator 10*c* can be disposed directly in the PWM module 10*a*. The control device 10 is connected to at least one position sensor 11 and/or to a force sensor 12. The position sensor 11 can be in the form of an angle of rotation sensor. The control device 10 is also connected to a drive device 23, to which the control device 10 can deliver a pulse width modulated control signal S10. By a connection to a vehicle system 30, the control device 10 can take into account a driving state of the vehicle, e.g. a speed.

Figure 4:
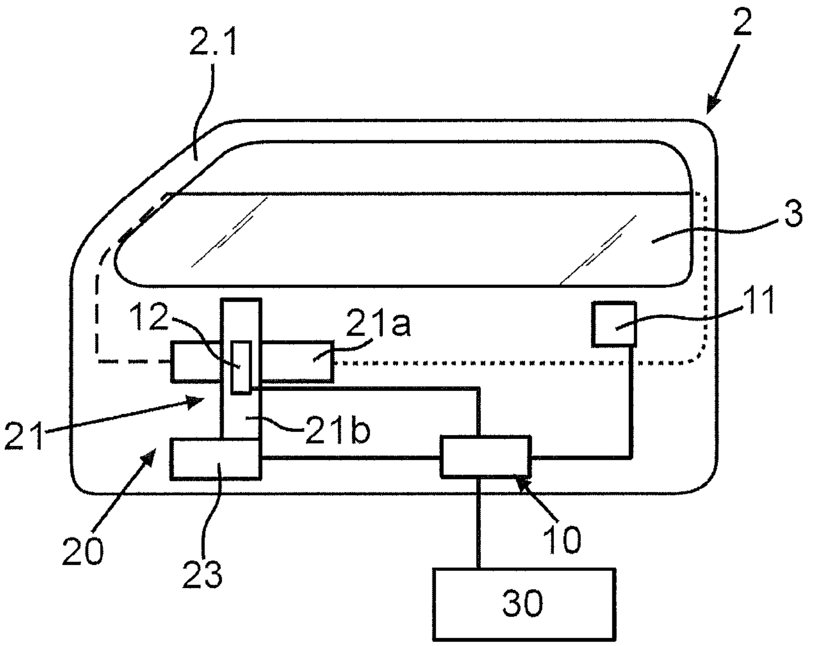
FIG. 4 shows an exemplary construction of a window positioning device according to an exemplary embodiment, with a drive device and its arrangement in relation to a control device on a vehicle door.

In FIG. 4 a vehicle door 2 is shown on which a window pane 3 is illustrated in a partly open position, and the window pane 3 can be displaced by a drive device 23 comprising a gearbox 21, which is formed by a first set of teeth 21*a* and a second set of teeth 21*b*, which are only shown schematically here. The respective set of teeth can also generally be in the form of an engagement device. The drive device 23 and the gearbox 21 are part of a window positioning device 20, by which the window pane 3 can be displaced. The drive device 23 is connected to a control device 10, and this is in turn connected to a vehicle system 30 and to a force sensor 12 and/or to a position sensor 11.

Figure 5:
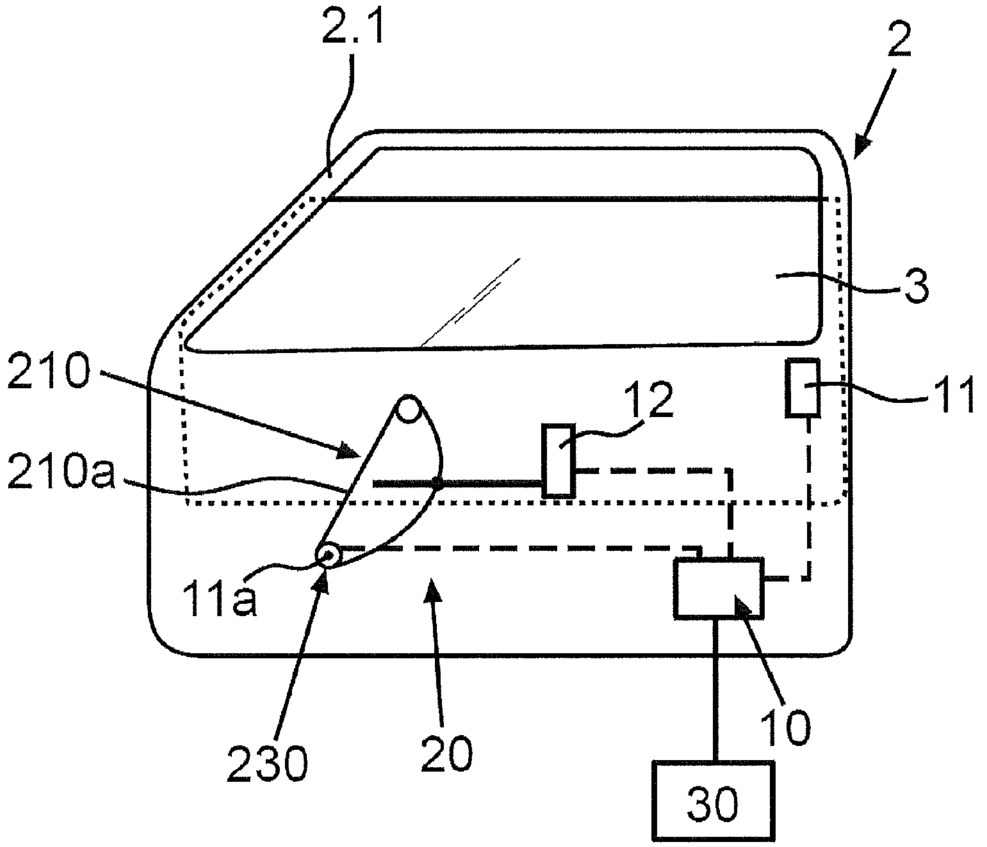
FIG. 5 shows another exemplary embodiment of a drive device of a window positioning device according to another exemplary embodiment, wherein a window pane of a vehicle in a vehicle door can be positioned by a cable of the drive device, and the drive device is in communication with a proposed control device.

In FIG. 5 a version of a vehicle positioning device 20 is shown in which a drive device is provided in the form of a rotary drive device 230. The rotary drive device 230 is designed to operate a cable 210*a*, wherein the cable is part of a cable traction drive 210, by which a window pane 3 on a vehicle door 2 can be displaced. A control device 10, which is connected to the rotary drive device 230, is in communication with a force sensor 12 and/or a position sensor 11, wherein an angle of rotation sensor 11*a* is also provided, which can deliver an angle of rotation of the rotary drive or of the rotary drive device 230 to the control device 10.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for operating a drive device of a window positioning device, the window positioning device being controlled by a control device to position a window pane of a vehicle to selectively cover a window opening, the drive device moving in an opening direction to open the window pane and moving in a closing direction to close the window pane, the method comprising:

operating the drive device to displace the drive device in the opening direction and bring the drive device into a first reduced load position, the drive device being displaced to the first reduced load position when the drive device is in an initial position in which the window pane is in a closed end position and when the window positioning device is in a first preload state for preloading the window pane;

starting from the drive device being in the first reduced load position, operating the drive device to displace the drive device in the closing direction and bring the drive device into a second reduced load position in which the window positioning device is in a second preload state; and maintaining the window positioning device in the second preload state at least temporarily, wherein the drive device is displaced to the first reduced load position by a first value of a drive parameter, the drive device is displaced to the second reduced load position by a second value of the drive parameter, the second value of the drive parameter is smaller than the first value of the drive parameter such that the drive device is displaced less in the closing direction than in the opening direction, the window opening is fully covered when the drive device is in the second reduced load position, and in the second preload state, the window positioning device is subjected to a smaller preload than in the first preload state.

2. The method as claimed in claim 1, wherein the drive device is a rotary drive device, and the drive parameter is an angle unit.

3. The method as claimed in claim 1, wherein the window positioning device comprises a set of teeth, and the drive parameter is an angle unit or a length unit.

4. The method as claimed in claim 1, wherein displacing the drive device to the second reduced load position is carried out with at least one of a reduced force and a reduced speed compared to displacing the drive device to the first reduced load position, and the force and/or speed of the drive device is controlled by a pulse width modulated control signal delivered by the control device to the drive device.

5. The method as claimed in claim 1, wherein the drive device is displaced to the first reduced load position in response to locking of the vehicle or turning off an engine of the vehicle.

6. The method as claimed in claim 1, wherein prior to displacing the drive device to the first reduced load position, the window pane is displaced from an at least partly open position into the end position.

7. The method as claimed in claim 1, wherein in displacing the drive device to the first reduced load position, the window pane is displaced from the end position into a first intermediate position, and the first intermediate position is at a distance of 1 to 10 millimeters from the end position.

8. The method as claimed in claim 1, wherein in displacing the drive device to the first reduced load position, the window pane is displaced from the end position into a first intermediate position, and the first intermediate position is at a distance of 0.5 to 3 millimeters from the end position.

9. The method as claimed in claim 1, wherein in displacing the drive device to the first reduced load position, the window pane is displaced from the end position into a first intermediate position, and the first intermediate position is at a distance of 0.25 to 1 millimeter from the end position.

10. The method as claimed in claim 1, wherein the control device delivers a pulse width modulated control signal to the drive device to control at least displacement of the drive device to the second reduced load position.

11. The method as claimed in claim 1, further comprising displacing the drive device in the closing direction, from the second reduced load position, to bring the window positioning device to the first preload state for preloading the window pane.

12. The method as claimed in claim 1, further comprising:

monitoring a speed of the motor vehicle; and after the speed of the motor vehicle reduces below a predetermined limit, waiting for a delay period and then triggering the drive device to be moved to the first reduced load position and then to the second reduced load position.

13. The method as claimed in claim 1, wherein the drive device is moved to the second preload position when the vehicle is not moving or moving at less than a predetermined speed, and the method further comprises displacing the drive device in the closing direction from the second preload position, so that the window positioning device is returned to the first preload state for preloading the window pane when the vehicle again moves at the predetermined speed.

14. The method as claimed in claim 1, wherein the first and second preload states relate to at least one of a bearing force, a contact pressure between gearbox components of the window positioning device, a traction force on a cable of the window positioning device, a torque on a gearwheel of the window positioning device and a thrust on a mechanical component of the window positioning device.

15. The method as claimed in claim 1, wherein there is a defined ratio between the first and second values of the drive parameter such that altering an amount of displacement of the drive device in the opening direction causes a corresponding alteration to displacement of the drive device in the closing direction.

16. A control device to operate a drive device of a window positioning device, the window positioning device positioning a window pane of a vehicle to selectively cover a window opening, the drive device moving in a closing direction to close the window pane and moving in an opening direction to open the window pane, the control device comprising a control unit coupled to the drive device to:

deliver a first control signal to the drive device, to displace the drive device in the opening direction and bring the drive device into a first reduced load position, the drive device being displaced to the first reduced load position when the drive device is in an initial position in which the window pane is in a closed end position and when the window positioning device is in a first preload state for preloading the window pane;

deliver a second control signal to the drive device, to displace the drive device in the closing direction from the first reduced load position, to bring the drive device into a second reduced load position in which the window positioning device is in a second preload state; and maintain the window positioning device in the second preload state at least temporarily, wherein the first control signal is produced according to a first value of a drive parameter, the second control signal is produced according to a second value of the drive parameter, the second value of the drive parameter is smaller than the first value of the drive parameter such that the drive device is displaced less in the closing direction than in the opening direction, the window opening is covered in the second reduced load position, and in the second preload state, the window positioning device is subjected to a smaller preload than in the first preload state.

* * * * *